United States Patent [19]
Davidson

[11] Patent Number: 5,627,567
[45] Date of Patent: May 6, 1997

[54] METHOD AND APPARATUS FOR ADAPTIVE TOUCH RECOGNITION IN A TOUCH SENSITIVE USER INTERFACE

[75] Inventor: Marc Davidson, Andover, Mass.

[73] Assignee: Hewlett-Packard Company, Palo Alto, Calif.

[21] Appl. No.: 594,356

[22] Filed: Jan. 30, 1996

Related U.S. Application Data

[63] Continuation of Ser. No. 287,447, Aug. 8, 1994, abandoned, which is a continuation of Ser. No. 54,113, Apr. 27, 1993, abandoned.

[51] Int. Cl.$^6$ ........................................ G08G 5/00
[52] U.S. Cl. ........................ 345/173; 345/170; 395/326
[58] Field of Search ........................... 345/156, 173, 345/179, 146, 170, 178; 178/18, 19; 395/155, 157, 159; 341/20, 22, 23, 24

[56] References Cited

U.S. PATENT DOCUMENTS

| | | |
|---|---|---|
| H716 | 12/1989 | McDonald et al. . |
| 3,497,617 | 2/1970 | Ellis . |
| 4,310,839 | 1/1982 | Schwerdt . |
| 4,587,520 | 5/1986 | Astle . |
| 4,698,460 | 10/1987 | Krein et al. . |
| 4,698,461 | 10/1987 | Meadows et al. . |
| 4,707,845 | 11/1987 | Krein et al. . |
| 4,806,709 | 2/1989 | Evans . |
| 4,885,574 | 12/1989 | Negishi ............................ 340/709 |
| 4,914,624 | 4/1990 | Dunthorn ......................... 340/712 |
| 4,992,630 | 2/1991 | Mletzko . |
| 5,038,401 | 8/1991 | Inotsume . |
| 5,046,030 | 9/1991 | Bitter et al. . |
| 5,119,079 | 6/1992 | Hube et al. . |
| 5,120,908 | 6/1992 | Zank et al. . |
| 5,161,535 | 11/1992 | Short et al. . |
| 5,189,732 | 2/1993 | Kondo . |
| 5,223,828 | 6/1993 | McKiel ............................. 340/709 |

FOREIGN PATENT DOCUMENTS

| | | |
|---|---|---|
| 0324306A2 | 9/1988 | European Pat. Off. . |
| 4007216A1 | 3/1990 | Germany . |
| 63-155223A | 6/1988 | Japan . |
| 1572680 | 8/1977 | United Kingdom . |
| 2099973 | 5/1981 | United Kingdom . |

OTHER PUBLICATIONS

English language version of German patent 4007216A1 which was cited by the German Patent Office in a counterpart German application no. P4406668.6-53. The English language version is believed to be an accurate translation of the German patent.

(List continued on next page.)

*Primary Examiner*—Richard Hjerpe
*Assistant Examiner*—Kent Chang

[57] ABSTRACT

A method and apparatus is provided for defining expanded touch zones for active control keys on a touch sensitive user interface panel. The user interface panel has one or more active control key display areas that each display a respective active control key, each active control key indicating an active control function that is available for selection by a user. The user selects a desired active control function by touching a probe to the user interface panel in a location corresponding to a touch zone defined for the active control key that indicates the desired active control function. Expanded touch zones for each active control key are defined, the expanded touch zone for each active control key having an area that is larger than the corresponding display area for the control key. When the user touches the probe to the interface panel, a determination is made as to whether the probe has touched an expanded touch zone for any active control key and if it has, the active control function indicated by the active control key corresponding to the expanded touch zone touched by the probe is selected, and if it has not, an indication is provided that no active control function has been selected. The size of the expanded touch zone defined for each active control key varies depending upon the existence and location of other active control keys on the display panel.

12 Claims, 10 Drawing Sheets

OTHER PUBLICATIONS

English language version of a German Patent Office action relating to a counterpart application (Apl. No. P 44 06 668.6–53) in which the three above–listed references were cited. The English language version is believed to be an accurate translation of the German Office action, and indicates the degree of relevance found by the German Patent Office with respect to the Japanese language reference.

Callahan, Jack, "An Empirical Comparison of Pie vs Linear Menus"U. of Maryland Dept Comp Sci, Sep. 1987.

METHOD AND APPARATUS FOR ADAPTIVE TOUCH RECOGNITION IN A TOUCH SENSITIVE USER INTERFACE

CROSS REFERENCE TO RELATED APPLICATION

This is a continuation of application Ser. No. 08/287,447 filed on Aug. 8, 1994, now abandoned, which is a continuation of application Ser. No. 08/054,113 filed on Apr. 27, 1993, now abandoned.

FIELD OF THE INVENTION

This invention relates to touch sensitive user interface display panels. More particularly, this invention provides expanded touch zones for each active control key on a touch sensitive user interface display panel so that a larger area may be touched in order to select any active control key. The area of each expanded touch zone is adaptively defined depending upon the existence and location of other active control keys.

BACKGROUND OF THE INVENTION

Touch sensitive display panels have been developed to provide a user interface to various types of systems. For example, touch sensitive user interfaces have been provided for computing and data processing systems, as well as for various types of diagnostic and testing equipment. Touch sensitive interfaces enable a user to select among various control keys displayed on a display panel. The user selects a desired control key by touching the display panel in a touch zone that corresponds to the desired control key. The touch zone for each control key on the display panel generally corresponds to the area on the display panel where the control key is displayed. Since it is often desirable to display many control keys on a display panel simultaneously, the display area for each control key is often rather small. As a result, a problem is encountered in many touch sensitive user interface systems. If the user does not touch the display panel within the small display area for the desired control key, the desired control key is not selected.

Another problem is encountered in touch sensitive user interface systems when the control key display area is small in relation to the size of a probe that the user must touch to the display panel in order to select a desired control key. In many touch sensitive user interface systems, the user's finger serves as the probe and the size of the average finger tip is often large in relation to the display area utilized to display the control keys. Therefore, touch sensitive user interface systems that limit the touch zone for each control key to its corresponding display area suffer from a problem in that they frequently experience "miss hits" wherein, through imprecision in the placement of the user's finger, the system selects a control key that differs from the one that the user desired to select.

In touch sensitive user interface systems that utilize the display area to define the touch zone for each control key, the frequency of "miss hits" can be reduced by enlarging the display area for each control key on the display panel. However, it is desirable to minimize the display area for each control key on the display panel because, as stated above, many systems that utilize touch sensitive user interfaces require that a large number of control keys be displayed on the display panel simultaneously. If the control key display area is enlarged, the number of control keys that can be simultaneously displayed is reduced.

SUMMARY OF THE INVENTION

In accordance with the invention, methods and apparatus are provided for operating a touch sensitive user interface panel. The user interface panel includes one or more active control key display areas, each of which displays a respective active control key. Each active control key indicates an active control function that is available for selection by a user. The user selects a desired active control function by touching the user interface panel in a location corresponding to a touch zone defined for the active control key that indicates the desired active control function.

In accordance with one illustrative embodiment of the invention, expanded touch zones for each active control key are defined, the expanded touch zone for each active control key having an area that is larger than the corresponding display area for the control key. The dimensions and shape of the expanded touch zone defined for each active control key are defined adaptively depending upon the existence and location of other active control keys on the user interface panel. Thus, the dimensions and shape of each expanded touch zone are automatically altered to avoid overlapping with other expanded touch zones when other active controls keys are located nearby on the interface panel. When the user touches the interface panel, a determination is made as to whether an expanded touch zone for any active control key has been touched and if it has, the active control function indicated by the active control key corresponding to the expanded touch zone touched by the user is selected. If an expanded touch zone for any active control key has not been touched, an indication is provided that no active control function has been selected.

In another illustrative embodiment of the invention, expanded touch zones for each active control key are defined and the boundary of each expanded touch zone is spaced by a dead zone distance from the boundary of every other expanded touch zone so that dead zones are defined between expanded touch zones of adjacent active control keys.

DETAILED DESCRIPTION

As stated above, the present invention is directed to a method and apparatus for adaptively defining expanded touch zones for active control keys on a touch sensitive user interface. The present invention may be utilized with any type of touch screen user interface, including those having "soft" controls. Soft controls are defined as controls that vary depending upon the operating mode of the system to which the user interface is coupled. Only the control keys that are relevant to the current operating mode of the system are displayed on the display panel. Whenever the operating mode of the system changes, the display panel is updated so that it displays only the control keys that are relevant to the new mode of operation. The control keys are soft because no particular control key is continuously displayed on the display panel and the control key displayed by a given display area varies with the operating mode of the system. Additionally, the display area utilized to display any given control key varies depending upon the operating mode of the system.

When soft controls are utilized, each control key is defined as being either active or inactive at any particular time. The active control keys are those that are displayed on the display panel and are therefore available for selection by the user. The inactive control keys are the remaining control keys that are not relevant to the current operating mode of the system and are therefore not displayed on the display panel and are not available for selection by the user.

Figure 1:
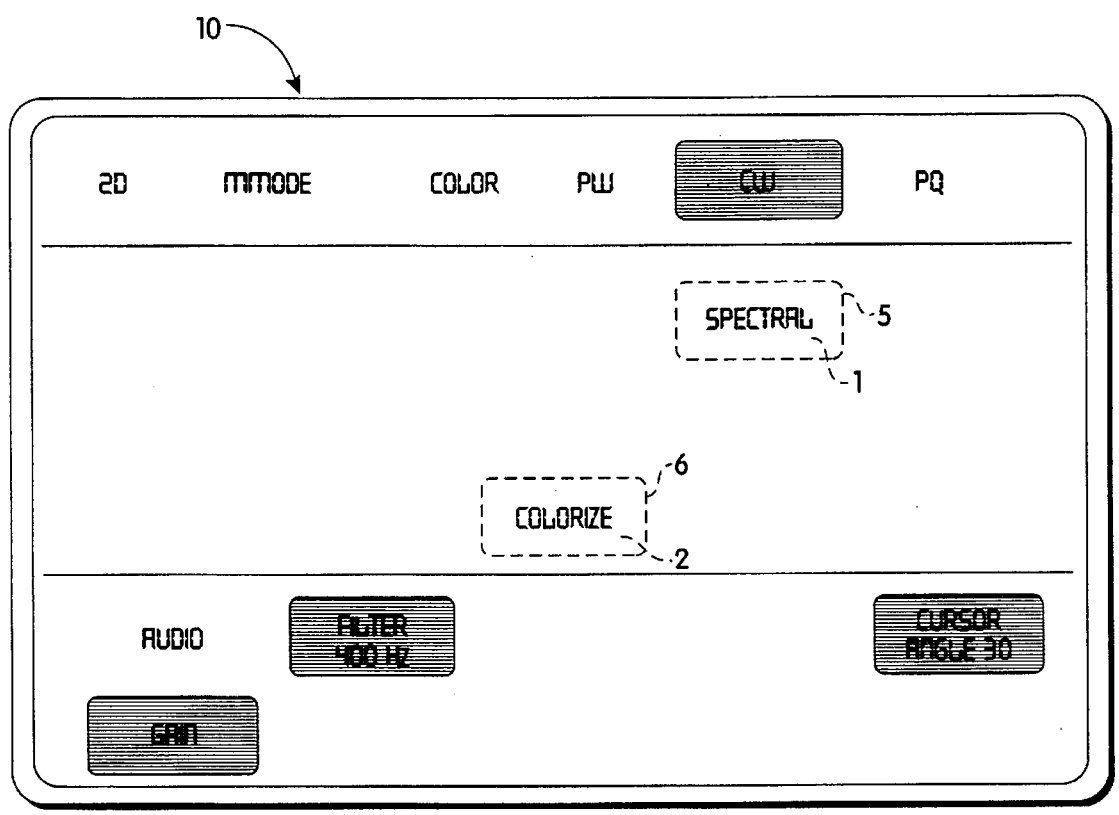
FIG. 1 illustrates a touch sensitive user interface panel having two non-selected active controls.
Figure 2:
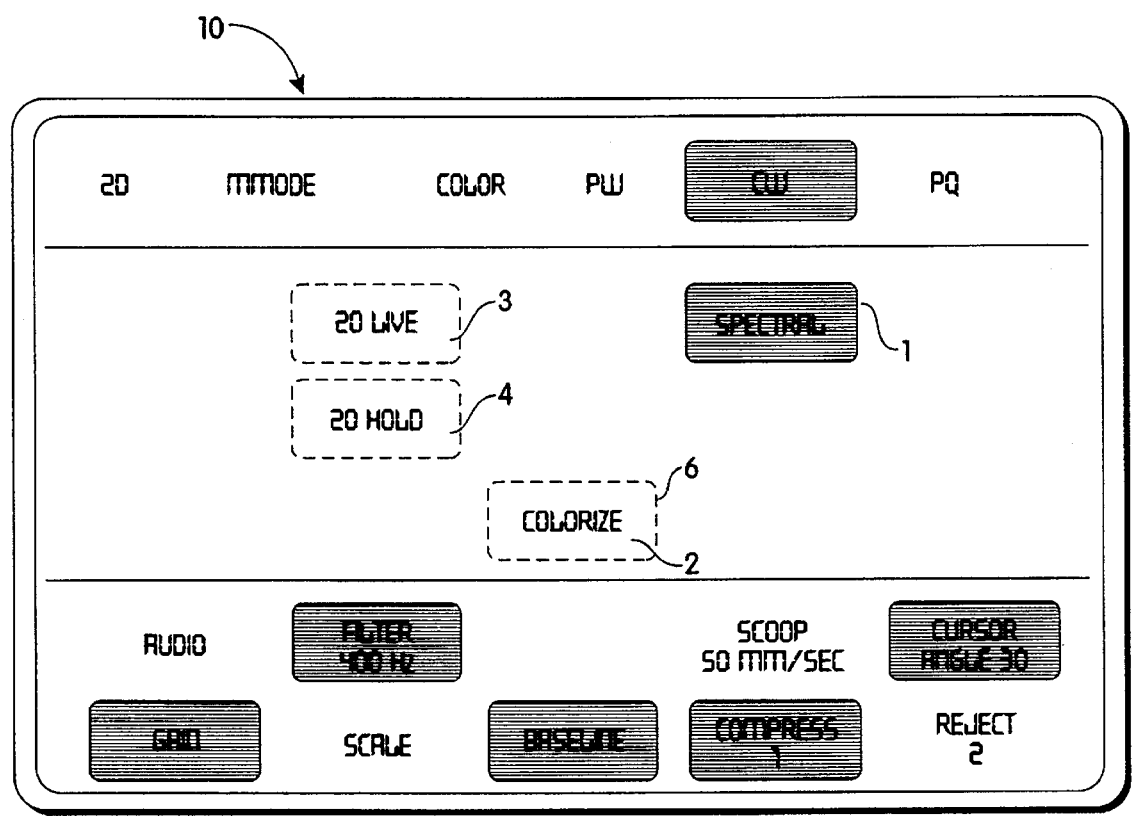
FIG. 2 illustrates the touch sensitive user interface panel of FIG. 1 following the selection of one of the active control keys.

FIGS. 1–2 illustrate an example of soft controls displayed on a display panel 10 of a touch screen user interface. In FIG. 1, the system to which the user interface is coupled is operating in a mode wherein two control keys 1 and 2 are active. Although both control keys 1 and 2 are active, neither of them has been selected by the user. Because neither control key has been selected, each is displayed with the text of its name illuminated on the display panel. The dotted lines 5 and 6 respectively indicate the control key display areas for control keys 1 and 2. The dotted lines 5 and 6 are shown in FIG. 1 merely for the purpose of explanation and are not actually displayed on the display panel 10. Therefore, the control key display area that the user can touch in order to select any non-selected control key is not delineated on the display panel.

FIG. 2 shows the state of the display panel 10 after the user has selected control key 1 by touching the display panel 10 at a location that falls within the control key display area for control key 1. As shown in FIG. 2, when control key 1 is selected, the display panel 10 is altered in two ways. First, additional control keys 3 and 4 appear on the display panel 10 because these control keys are relevant to the new mode of operation that the system enters as a result of the user's selection of control key 1. Second, the illumination of the control key display area for control key 1 is inverted so that the portions of the control key display area that do not include text are illuminated and the portions of the control key display area that display text are not illuminated. One purpose of the present invention is to define expanded touch zones for each active control key that is larger than the control key display area so that the user is not required to touch the display panel precisely within the display area of the desired control key in order to select the desired control key. An expanded touch zone for a given control key defines an area that, when touched by the user, indicates that the given control key has been selected. When expanded touch zones are defined for each active control key, a higher success rate is achieved for touches of the display panel because the user more frequently touches the display panel within the expanded touch zone for the desired active control key, thereby successfully selecting the desired control key.

Although it is desirable to define expanded touch zones for each active control key, there is a limit on how large the expanded touch zones can be. If the expanded touch zones for the active control keys are too large, then the expanded touch zones for two active control keys may overlap. The expanded touch zones for two active control keys cannot overlap because if the user touched a location within the expanded touch zones of two active control keys, the system would be unable to determine which control key had been selected.

As can be seen from the foregoing, the amount by which the touch zone for each active control can be expanded depends upon the existence and proximity of other active control keys on the display panel. The adaptive touch recognition system of the present invention, as is more fully described below, considers the layout of the display panel in determining the area of the expanded touch zone defined for each active control key. For an active control key that is located far away from any other active control keys, the adaptive touch recognition system defines an expanded touch zone area that is larger than the areas of expanded touch zones defined for active control keys that are located adjacent to other active control keys. For any given active control key, the existence and location of adjacent active control keys will vary over time as the operating mode of the system changes. The adaptive touch recognition system of the present invention takes these changes in display panel layout into consideration and adapts the area of the expanded touch zone defined for each active control key. Therefore, the size and shape of the expanded touch zone defined for any active control key is not predetermined and is defined based upon the display panel layout at the time that the display panel is touched.

Figure 3A:
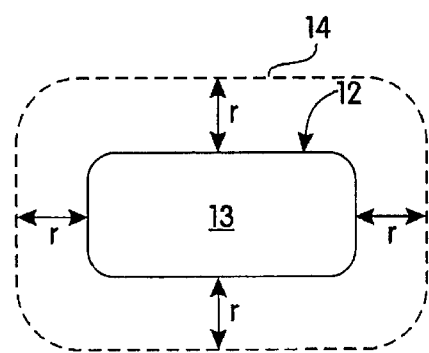
FIGS. 3(a)–3(c) illustrate the manner in which the expanded touch zone generated for an active control key varies depending upon the location and proximity of other control keys on the display panel.
Figure 3B:
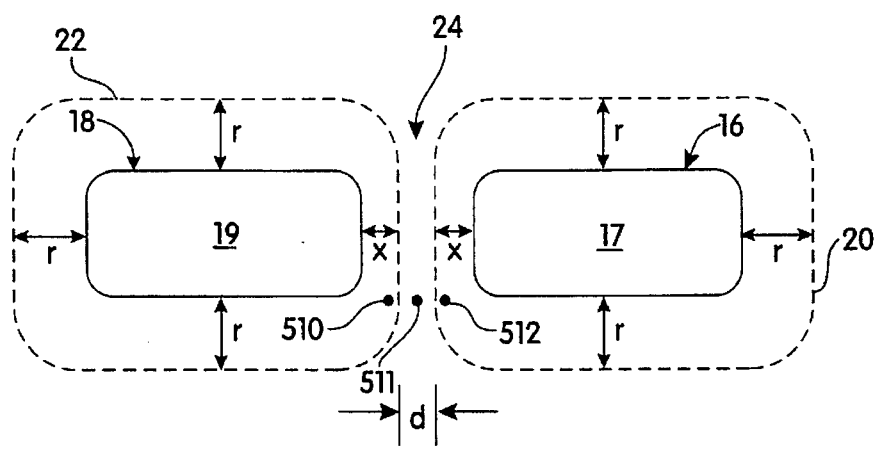
Figure 3C:
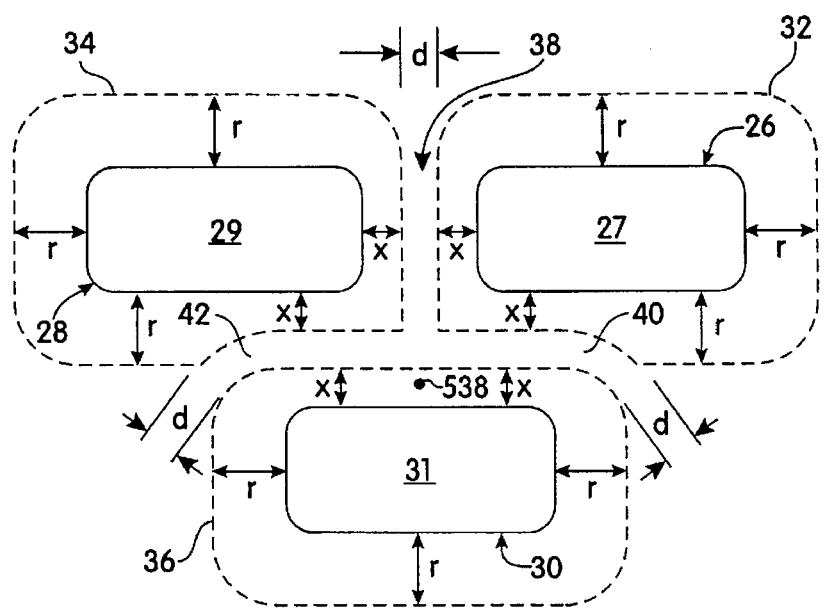

FIGS. 3(a)–3(c) illustrate the manner in which the adaptive touch recognition system of the present invention varies the amount by which a touch zone for an active control key is expanded based upon its proximity to other active control keys. In FIG. 3(a), a single active control key 13 is shown, the control key having a control key display area 12. An expanded touch zone 14 defined for the active control key 13 is shown as a dotted line. The boundary of expanded touch zone 14 is spaced from the control key display area 12 by a predetermined amount r in every direction. Since there are no other active control keys adjacent to control key 13, the boundary of expanded touch zone 14 need not be spaced from the control key display area 12 by an amount less than the predetermined amount r in any direction because it will not overlap with the expanded touch zone of any other active control key.

Although the boundary of the expanded touch zone for control key 13 is shown in FIG. 3(a) as being spaced from the control key display area 12 by the same predetermined amount r in every direction, it should be understood that the expanded touch zone can also be defined as having its boundary spaced from the control key display area only in selected directions. Additionally, it should also be understood that the boundary of the expanded touch zone need not be spaced from the control key display area by the same amount in every direction. The boundary of the expanded touch zone can alternatively be spaced from the control key display area by varying amounts in different directions.

FIG. 3(b) illustrates two adjacent active control keys 17 and 19 and their respective control key display areas 16 and 18. Expanded touch zones 20 and 22 are respectively defined for the active control keys 17 and 19 and are shown as dotted lines. The boundary of expanded touch zone 20 is spaced from the control key display area 16 by the predetermined distance r in every direction, except for the direction facing control key 19. Similarly, the boundary of expanded touch zone 22 is spaced from the control key display area 18 by the predetermined distance r in every direction, except for the direction facing control key 17. If the boundaries of the expanded touch zones for control keys 17 and 19 were spaced from their respective control key display areas by the predetermined distance r in the directions facing each other, the expanded touch zones 20 and 22 would overlap. As stated above, the touch zones of two active control keys cannot overlap because if the user touches the display panel in the area of the overlap, the system cannot determine which of the two active control keys has been selected.

In order to prevent the expanded touch zones 20 and 22 of adjacent control keys 17 and 19 from overlapping, the adaptive touch recognition system of the present invention defines the boundaries of the expanded touch zone for each as being spaced from its respective control key display area by less than the predetermined distance r in the direction facing the adjacent active control key. As shown in FIG. 3(b), in the direction facing the adjacent active control key, the boundaries of expanded touch zones 20 and 22 are respectively spaced from control key display areas 16 and 18 by a predetermined distance x that is smaller than the predetermined distance r by which they are spaced from the control key display areas 16 and 18 in every other direction.

In one embodiment of the adaptive touch recognition system of the present invention, dead zones are established between the expanded touch zones of adjacent active control keys. As shown in FIG. 3(b), the distance x by which the boundaries of expanded touch zones 20 and 22 are respectively spaced from control key display areas 16 and 18 is selected so that the expanded touch zones 20 and 22 are spaced from each other by a predetermined distance d. The space between the expanded touch zones 20 and 22 defines a dead zone 24 between control keys 17 and 19. A dead zone is defined as an area that, when touched by the user will not select any active control key. The purpose of the dead zone is to prevent the existence of areas on the display panel wherein the determination of the selected control key varies based upon a change in touch location of only a few pixels. When dead zones are established between the expanded touch zones of adjacent control keys, the areas of the expanded touch zones for these control keys are not maximized. However, it has been determined that any disadvantage suffered by failing to recognize some touches that might fall within larger expanded touch zones for adjacent control keys is outweighed by avoiding miss hits that might occur whereby a control key other than the one intended by the user is selected when the user touches a location near a boundary between the expanded touch zones of two adjacent active control keys.

Although the expanded touch zones 20 and 22 are illustrated in FIG. 3(b) as being spaced from the control key display areas 16 and 18 by the same distance x in the directions facing one other, it should be understood that the distance by which two adjacent expanded touch zones are spaced from their respective control key display areas in the direction facing adjacent control keys need not be identical. Additionally, as can be seen from FIG. 3(c), the amount by which the expanded touch zone for any single control key is spaced from its corresponding control key display area in the direction of adjacent active control keys can vary and need not be uniform. This is shown, for example, by the expanded touch zone 34 which is spaced from its corresponding display area 28 by the amount x at its lower right corner, and gradually increases its distance from display area 28 until it is spaced by the amount r at its lower left corner. The key relationship maintained is the establishment of a dead zone of the chosen distance between the expanded touch zones of adjacent active control keys.

It should be further understood that although dead zones are defined between the expanded touch zones of adjacent active control keys in one embodiment of the invention, the adaptive touch recognition system of the present invention can also be practiced without defining dead zones between expanded touch zones. When dead zones are not defined between expanded touch zones, the predetermined distance d (shown in FIG. 3(b)) by which the expanded touch zones of adjacent active control keys are spaced is set to zero. As a result, the expanded touch zones of adjacent active control keys abut one another but do not overlap.

FIG. 3(c) illustrates control key display areas 26 28 and 30 for three active control keys 27, 29 and 31 that are positioned adjacent to one another. Expanded touch zones 32, 34 and 36 are respectively defined for the active control keys 27, 29 and 31 and are shown as dotted lines. The boundary of the expanded touch zone for each control key is spaced from its respective control key display area by the predetermined distance r in every direction except for those directions facing the adjacent active control keys. In the directions facing adjacent active control keys, the boundary of each expanded touch zone is spaced from its respective control key display area by a variable distance that is less than the distance r, thereby ensuring that the expanded touch zones do not overlap. Dead zones 38, 40 and 42, each having a width equal to the predetermined distance d, are respectively defined between the expanded touch zone pairs (32, 34), (32, 36) and (34, 36).

As can be appreciated from FIGS. 3(a)–3(c), when an active control key is positioned on the display panel so that it is not adjacent to any other active control key, the adaptive touch recognition system of the present invention defines an expanded touch zone for the control key that is much larger than the control key display area for that control key. As a result, the user need only touch the display panel in the general location of the control key display area in order to select the control key. When an active control key is positioned on the display panel adjacent to one or more other active control keys, the adaptive touch recognition system of the present invention defines an expanded touch zone for that control key that is as large as the expanded touch zones for isolated control keys except that it is reduced in directions facing adjacent control keys to ensure that two expanded touch zones do not overlap.

Although the expanded touch zone for control keys that are positioned adjacent to one or more other active control keys is smaller than for control keys that are isolated on the display panel, it has been found that the touch zones for these control keys need not be as large as those for isolated control keys. Testing has indicated that when only one active control key is displayed on the display panel, users are somewhat imprecise in the display panel location that is touched when they desire to select the control key. Although users tend to touch the display panel somewhere in the general area where the control key is displayed, they do not necessarily touch the panel at a point that is on, or very close to the control key display area. However, when two or more control keys are close to each other on the display panel, it has been found that users subconsciously become more accurate and tend to touch the display panel at a location that is closer to the control key that they desire to select. Therefore, the touch zones for active control keys that are adjacent to other active control keys on the display panel need not be as large as for isolated control keys, because users tend to be more accurate in touching the display panel when selecting these control keys.

Figure 4:
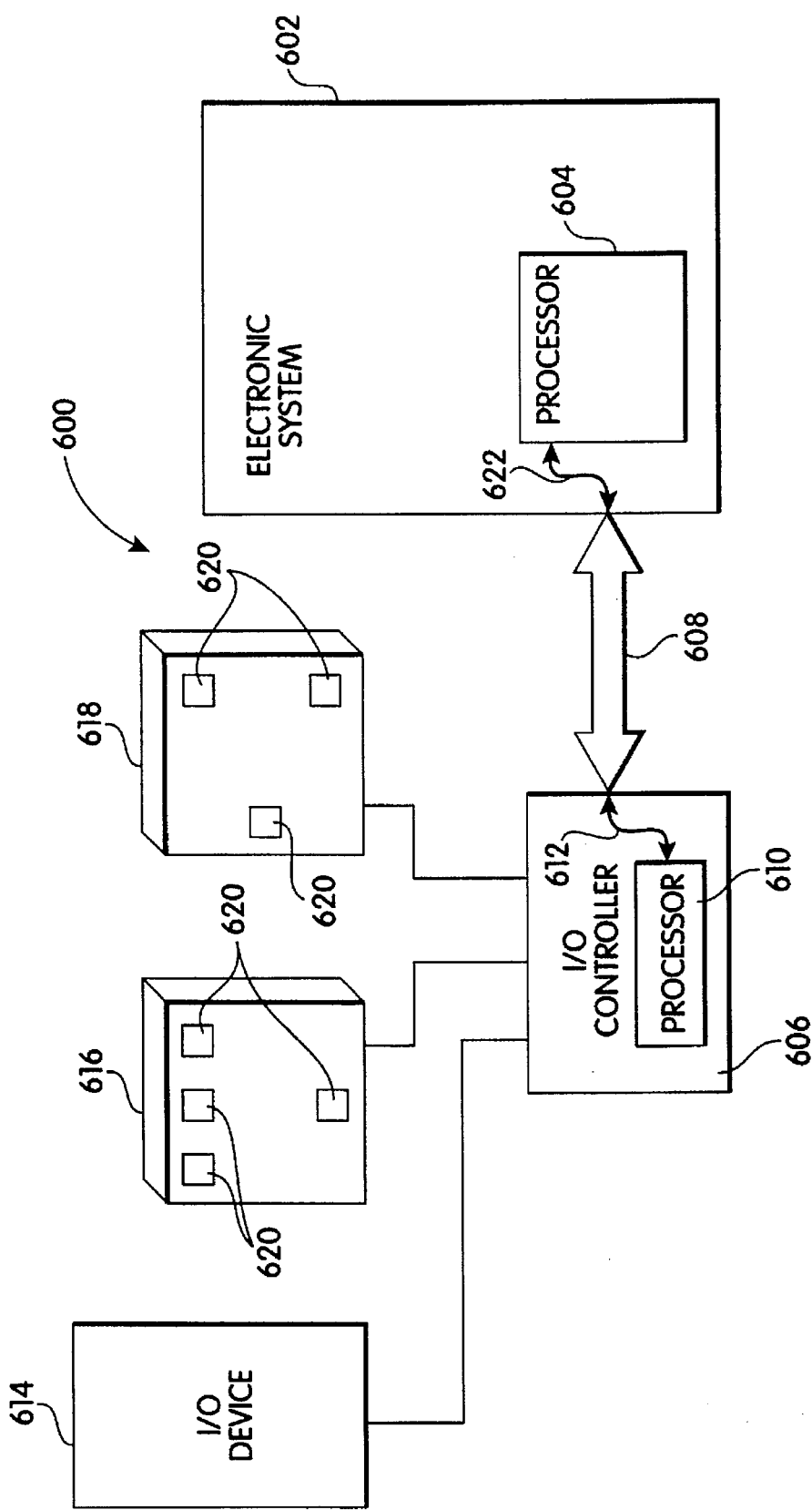
FIG. 4 illustrates one embodiment of the adaptive touch recognition system of the present invention.

FIG. 4 illustrates an example of a hardware implementation of the adaptive touch recognition system of the present invention. The system 600 includes an electronic system 602 having a processor 604. As stated above, the electronic system could be a computing or data processing system, or it could be any one of various types of diagnostic or testing equipment. In one particular embodiment of the invention, the electronic system is an ultrasound imaging system. The electronic system 602 is coupled to an I/O controller 606 via a communications link 608. The I/O controller controls the operation of an I/O device 614 and two touch sensitive user interface display panels 616 and 618.

The touch sensitive user interface panels 616 and 618 can be of any type. However, in one particular embodiment of the invention, the touch sensitive user interface display panels include a display and an analog resistive touch panel that is fitted over the display and is affixed thereto. When touched, the resistive touch panel generates analog signals indicating the touched location in terms of its X-Y coordinates on the touch panel. These analog signals are converted to digital values and are mapped, using data stored during calibration, to a corresponding pixel location on the display. The display is a pixel addressable display, such as a liquid crystal display (LCD), a cathode ray tube (CRT) or an electroluminescent panel (EL).

The particular system configuration shown in FIG. 4 is provided for illustrative purposes only and it should be realized that the I/O controller 606 could be utilized to control many more I/O devices of various types, as well as additional touch sensitive user interface panels.

The I/O controller 606 is provided with a processor 610 that is coupled to the electronic system 602 via communication links 608 and 612. The processor 610 in the I/O controller 606 is utilized to control the display of control key display areas 620 on the touch sensitive user interface display panels 616 and 618. In one embodiment of the invention, the processor 610 is not particularly powerful and only controls rudimentary functions associated with the display panels 616 and 618, such as scanning the screens to determine when a touch occurs and updating the various control key display areas. In this embodiment, a software routine that implements the adaptive touch recognition process is primarily executed on the processor 604 that is provided in the electronic system 602. The processor 604 is coupled to the I/O controller 606 via communication links 608 and 622, thereby enabling the processor 604 to control the operation of the display panels 616 and 618. It should be understood that, in an alternate embodiment of the invention, a more powerful processor 610 can be provided in the I/O controller 606 and the software routine for implementing the adaptive touch recognition process of the present invention can be executed primarily on processor 610.

Figure 5:
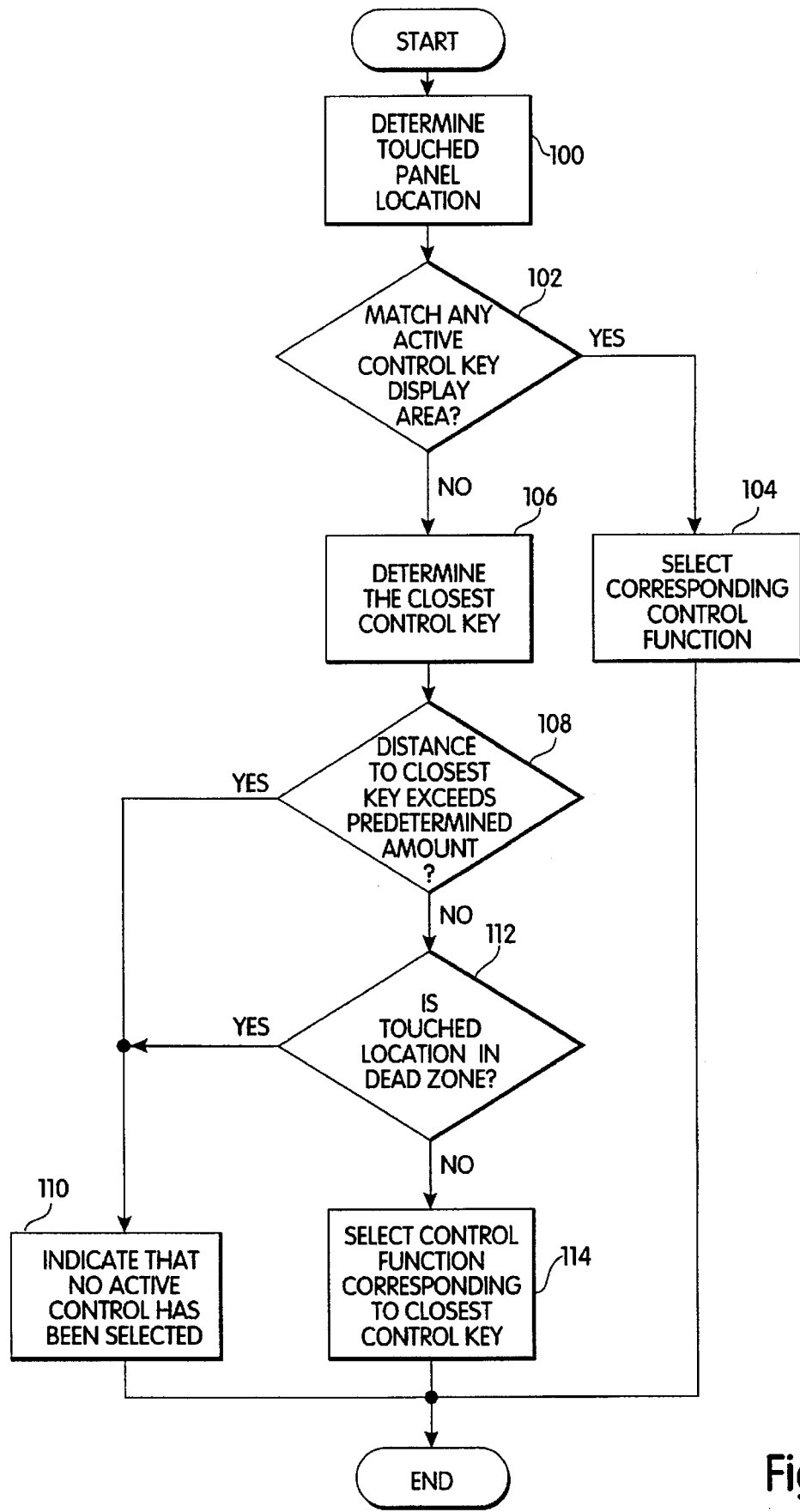
FIG. 5 is a flowchart illustrating the primary steps of the adaptive touch recognition process of the present invention.

Reference is now made to FIG. 5 which is a flow chart of the primary steps of the adaptive touch recognition process for determining which, if any, active control function has been selected when a user touches to the display panel. The adaptive touch recognition process shown in FIG. 5 is implemented by a software routine that is executed on processor 604 or processor 610 as described above. Initially, the location of the display panel that has been touched by the probe is determined at step 100. When the user interface display panel is touched, the display panel generates signals indicating the location on the display panel that was touched by the probe. In one embodiment of the invention, the user interface panel averages the pixels touched by the probe and indicates the touch location by the X-Y coordinates of a single pixel that corresponds to the location where the center of the probe touched the display panel. By examining the signals generated by the display panel, the touch location on the display panel is determined at step 100. After the touch location is determined, the adaptive touch recognition process proceeds to step 102 wherein a determination is made as to whether the touch location matches a control key display area for any active control. The touch location matches a control key display area for an active control key if it falls within the display area for that active control key.

When it is determined at step 102 that the touch location matches the control key display area for an active control key, the adaptive touch recognition process proceeds to step 104 wherein the active control function indicated by the control key corresponding to the matched control key display area is selected. The control function is selected by generating a control signal in processor 604 or 610 that indicates to the computer system 602 that the user has selected the control function for processing. After the control function is selected at step 104, the adaptive touch recognition process terminates. Thus, when a user touches the display panel in a location that falls within the control key display area for an active control key, the control function corresponding to that control key is selected.

When it is determined at step 102 that the touch location does not match the display area for any active control key, the adaptive touch recognition process proceeds to step 106 wherein the active control key display area that is closest to the touch location is determined. Additionally, the distance between the touch location and the closest active control key display area is calculated at step 106. Thereafter, the adaptive touch recognition process proceeds to step 108 where a determination is made as to whether the distance between the closest active key control display area and the touch location exceeds a predetermined distance.

As stated above with regard to FIG. 3(a), for each active control key that is not adjacent to any other active control keys, an expanded touch zone is defined that has its boundary spaced from the control key display area in every direction by a predetermined distance r. In one embodiment of the invention, each user interface display panel has a 512×256 array of pixels, and the control key display area for each active control key is defined by a 66×32 array of pixels. For these particular display panel and control key display area sizes, testing has indicated that the adaptive touch recognition system performs well when the predetermined distance r is established as equaling twenty-five pixels. It should be appreciated that the predetermined distance r can alternatively be established as being equal to various other numbers of pixels that would also provide satisfactory performance of the adaptive touch recognition system. Additionally, as described above in reference to FIG. 3(a), the boundaries for the expanded touch zones need not be spaced from their control key display areas by the same distance in every direction and can be spaced by differing distances in different directions. In fact, expanded touch zones can be defined that are spaced from the control key display areas only in certain directions.

When it is determined at step 108 that the distance between the touch location and the closest active control key display area exceeds the predetermined distance, the adaptive touch recognition process recognizes that the touch location does not fall within the expanded touch zone of the closest active control key display area. Therefore, the adaptive touch recognition process proceeds to step 110 which indicates that no active control function has been selected by the user. Thereafter, the adaptive touch recognition process terminates.

When it is determined at step 108 that the distance between the touch location and the closest active control key display area does not exceed the predetermined distance, the adaptive touch recognition process proceeds to step 112 wherein a determination is made as to whether the touch location falls within a dead zone between the closest active control key and any active key control adjacent thereto. As described above with regard to FIG. 3(*b*), in one embodiment of the invention, dead zones are established between the expanded touch zones of adjacent active control keys. Two or more active control keys are defined herein as being adjacent to one another if they are positioned relative to each other in a manner such that their expanded touch zones cannot be as large as those defined for isolated control keys. More specifically, two control keys are adjacent if either: (1) they are positioned such that their expanded touch zones would overlap if the boundaries for each expanded touch zone were spaced from the corresponding control key display area by the predetermined distance r in every direction; or (2) they are positioned such that a dead zone having a predetermined distance d would not be maintained between them if the boundaries of the expanded touch zone for each were spaced from the corresponding control key display area by the predetermined distance r in every direction.

Through experimentation, it has been found that for a system having the display panel and control key display area sizes described above, satisfactory dead zones can be defined between expanded touch zones of adjacent active control keys by setting the predetermined distance d by which the expanded touch zones are spaced as being equal to three pixels. It should be understood that the predetermined distance d can also be set to various other numbers of pixels and still provide satisfactory performance of the adaptive touch recognition process. Additionally, as described above in reference to FIG. 3(*b*), the predetermined distance d can alternatively be set to zero, thereby providing no dead zone between the expanded touch zones of adjacent active control keys.

When it is determined at step 112 that the touch location falls within a dead zone, the adaptive touch recognition process proceeds to step 110 which generates a signal indicating that no active control function has been selected. As stated above, when the touch location falls within a dead zone, no active control key has been selected.

When it is determined at step 112 that the touch location does not fall within a dead zone between the closest active control key and any other active control key, the adaptive touch recognition process proceeds to step 114 wherein the control function corresponding to the closest active control key is selected. The control function is selected, in much the same manner as was described above with regard to step 104, by generating a control signal in processor 604 or 610 that indicates to the computer system 602 that the user has selected the control function for processing.

As can be seen from the foregoing, the adaptive touch recognition process illustrated in FIG. 5 defines an expanded touch zone for each active control key on the display panel. The expanded touch zone for each active control key has an area that is larger than the display area for the control key. Additionally, the area of the expanded touch zone for each active control key varies depending upon the existence and location of other active control keys on the display panel. When two active control keys are adjacent to one another, the areas of their expanded touch zones is less than the areas of expanded touch zones for isolated active control keys because the adaptive touch recognition process ensures that the expanded touch zones of adjacent control keys do not overlap.

As can be further seen from the adaptive touch recognition process illustrated in FIG. 5, an expanded touch zone is defined for each active control key that has a boundary that is spaced from its corresponding control key display area by a predetermined distance in every direction except for directions facing adjacent active control keys. In order to ensure that the expanded touch zones of adjacent active control keys do not overlap, the boundary of the expanded touch zone for a control key is spaced from its corresponding control key display area by less than the predetermined distance in directions facing adjacent active control keys. Additionally, for the embodiment of the invention shown in FIG. 5 wherein dead zones are defined between the expanded touch zones of adjacent active control keys, the boundary of the expanded touch zone for each active control key is spaced from its corresponding display area by less than the predetermined distance in directions facing adjacent active control keys to ensure that the expanded touch zones for adjacent active control keys are spaced from each other by the predetermined dead zone distance.

Figure 6:
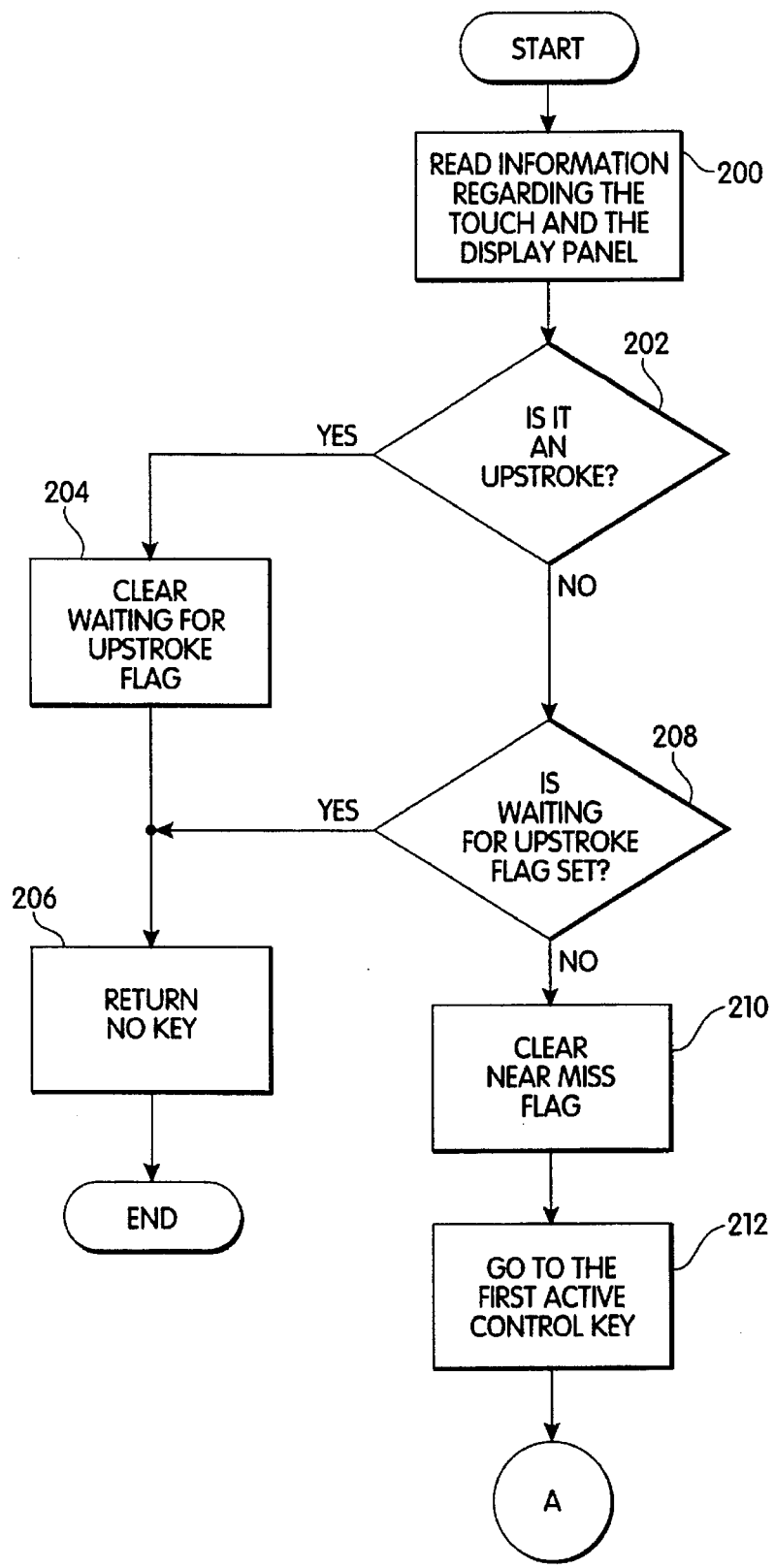
FIGS. 6–8 are a flowchart of the steps of one method for implementing the adaptive touch recognition process.

Reference is now made to FIG. 6 which is a flow chart of one particular method for implementing the adaptive touch recognition process of the present invention. This particular method has been found to implement the adaptive touch recognition process in an accurate and efficient manner. However, it should be understood that this method is provided for illustrative purposes only and that the invention is not limited to this method. Alternate methods can also be utilized to implement the adaptive touch recognition process of the present invention based upon the teachings provided herein.

The method illustrated in FIG. 6 is implemented by a software routine that is executed by processor 604 or 610 (FIG. 4) as described above. Processor 610 repeatedly scans the display panel to detect when an upstroke or downstroke occurs. A downstroke occurs whenever processor 610 determines that the probe is contacting a pixel that was not contacted when the display panel was previously scanned. As stated above, in one embodiment of the invention, the display panel indicates the average X-Y coordinates of the area touched by the probe, thereby indicating a single pixel corresponding to the location on the display panel that was touched by the center of the probe. For this embodiment, a downstroke is defined whenever the probe is put into contact with the display panel, or when the probe position is changed as indicated by a change in the X-Y coordinates of the average pixel. Therefore, multiple downstrokes can occur when the probe position on the display panel is changed, even if the probe is not removed from contact with the display panel. An upstroke occurs whenever the probe is removed or released from the display panel so that it no longer touches any portion of the display panel.

The software routine shown in FIG. 6 is called whenever an upstroke or downstroke occurs. At that point, the software routine reads in information regarding the location of the probe and the status of the display panel at step 200. The information regarding the location of the probe that is read by the routine includes: (1) whether the action that called the routine was an upstroke or downstroke; (2) the X-Y coordinates of the average touched pixel; and (3) if the system utilizes multiple display panels, the identification of which display panel has been touched or released. In addition to the information regarding the probe location, information is also read regarding the status of the display panel, this information including: (1) the identification of each active control key on the user interface display panel; and (2) the X-Y coordinates of the control key display areas corresponding to each active control key. As stated above, the identity and location of the active control keys on the display panel may vary depending upon the operating mode of the system coupled to the user interface. At any given time, the identity and location of the active control keys on the user interface display panel is stored either in memory utilized by the system, or in memory dedicated to the user interface. Therefore, when the software routine illustrated in FIG. 6 is called, it reads from memory the necessary information regarding the status of the display panel at the time that the upstroke or downstroke occurred which called the subroutine.

After the above-described information has been read, the routine proceeds to step 202 wherein a determination is made as to whether the action that prompted the call of the routine was an upstroke. The software routine illustrated in FIG. 6 only recognizes one valid touch of the display panel and requires that the probe be removed from the display panel before another valid touch will be recognized. A valid touch is defined as one that falls within the touch zone of an active control key. After a valid touch has occurred, all further touches of the display panel are ignored until an upstroke occurs, i.e. until the probe is removed from the display panel. There are two reasons for disregarding all touches of the display panel that occur after a valid touch but before an upstroke occurs. First, once the user has made a valid touch of the display panel, the user may be somewhat sloppy when removing the probe from the display panel and may inadvertently slide it across the display panel, thereby touching the probe to a location on the display panel that falls within the expanded touch zone of another active control. However, once an active control has been recognized as being touched and selected, it is assumed that the user will remove the probe from the display panel before attempting to select another active control key. Therefore, once an active control key has been selected, a "waiting for upstroke" flag is set in the manner described below. Thereafter, all further touches of the display panel (i.e. downstrokes) are ignored until the waiting for upstroke flag is cleared, indicating that an upstroke has occurred.

Second, as described above, when an active control key is selected by the user, the system may enter a new operating mode. As a result, the status of the display panel may change and additional active control keys may appear that are adjacent to the selected control key. If the selected control key is not located near any other active control keys on the display panel, its expanded touch zone will be quite large. However, if new control keys appear on the display panel as a result of the control key being selected by the user, the location touched by the user to select the isolated control key may fall within the expanded touch zone of a new control key that appears on the display panel in response to the user's selection of the isolated control key. To avoid a second, undesired control key selection once the user has selected an active control key, the software routine does not recognize the selection of any other active control key until the waiting for upstroke flag is cleared.

When it is determined at step 202 that the software routine was called as the result of an upstroke, the routine proceeds to step 204 wherein the waiting for upstroke flag is cleared to indicate that the probe has been removed from the user interface display panel and therefore, further touches of the panel should be recognized. Thereafter, the routine proceeds to step 206 which returns an indication that no key has been selected and then terminates. The software routine, at step 206, returns with an indication that no key has been selected because the activity that called the software routine was an upstroke. An upstroke simply indicates that the probe was removed from the display panel and does not indicate the selection of any active control key.

When it is determined at step 202 that the activity that called the software routine was not an upstroke, the routine recognizes that a downstroke has occurred and proceeds to step 208 wherein a determination is made as to whether the waiting for upstroke flag is set. If it is determined at step 208 that the waiting for upstroke flag is set, the routine proceeds to step 206 which returns an indication that no active control key has been selected. As stated above, once an active control key has been selected, the waiting for upstroke flag is set indicating that all further downstrokes should be ignored until the probe is removed from the display panel. Therefore, when it is recognized at step 208 that the waiting for upstroke flag is set, the software routine determines that the touch which called the routine should be ignored and therefore, the routine returns an indication that no active control key was selected by the touch.

When it is determined at step 208 that the waiting for upstroke flag is not set, the software routine proceeds to step 210 which clears a flag indicating that a near miss has occurred. The purpose of the near miss flag is fully described below. The near miss flag is cleared at step 210 as an initialization step prior to the processing of a downstroke.

After the near miss flag is cleared, the routine proceeds to step 212 which selects the first active control key for processing. As was described above, the information that was read at step 200 includes the identity and location of each active control key on the user interface display panel. The selection of any particular active control key as being the first to be processed is totally arbitrary. The software routine only requires that the active control keys be classified in some manner so that they may each be successively processed in an organized manner as described below.

After the first control key has been selected for processing, the software routine proceeds to step 214 (FIG. 7) wherein a determination is made as to whether the last active control key has been processed. When it is determined at step 214 that the last active control key has not been processed, the routine proceeds to step 216 wherein a determination is made as to whether the touch location matches the control key display area for the selected active control key. The touch location matches a control key display area when its X-Y coordinates fall within the range of X-Y coordinates defining the display area.

When it is determined at step 216 that the touch location matches the control key display area of the selected active control key, the software routine proceeds to step 218 wherein a key index is set to indicate the matched active control key. The key index is a data field that is supplied to the system when the routine returns after being called by a touch of the display panel. The key index indicates which, if any, active control key has been selected by the touch that called the software routine. The key index is set at step 218 when a valid touch has occurred, i.e. when a downstroke has occurred that matched the display area for an active control key. After the key index is set at step 218, the software routine proceeds to step 220 wherein the waiting for upstroke flag is set. As stated above, the purpose of the waiting for upstroke flag is to indicate that a valid touch has occurred and that additional downstrokes should be ignored until the probe has been removed from the display panel. After the waiting for upstroke flag is set at step 220, the software routine proceeds to step 222 which returns the control key indicated by the key index. As stated above, the key index is utilized to indicate which, if any, active control key has been selected by the touch that called the software routine.

As described above, when it is determined at step 216 that the touch matches the control key display area of an active control key, the key index is set, at step 218, to indicate the control key corresponding to the matched display area. The key index for the matched control key is returned at step 222, and the software routine then terminates. In this manner, when it is determined that the touch matches the control key display area of the active control key being processed, no further active control keys are processed.

When it is determined at step 216 that the touch does not match the control key display area for the control key being processed, the software routine proceeds to step 224 wherein a determination is made as to whether the distance between the touch location and the control key display area of the control key being processed exceeds a predetermined distance in the X coordinate direction. As was described above in reference to FIG. 3(a), a touch is recognized by the adaptive touch recognition process as selecting an active control key when it falls within an expanded touch zone defined for the control key. The maximum size of an expanded touch zone for a control key is defined when its boundary is spaced from the display area of the control key by a predetermined distance r. Therefore, to determine whether the touch location may fall within the expanded touch zone of the control key being processed, the software routine determines whether the distance between the touch location and the display area of the control key being processed exceeds the predetermined distance r. If the distance between the touch location and the display area exceeds the predetermined distance, the software routine recognizes that the touch location does not fall within the expanded touch zone for the control key being processed and proceeds to process the next active control key in the manner described below.

The distance between the touch location and the control key display area of the control key being processed can be determined utilizing the Pythagorean theorem. However, if the X coordinate of the touch location differs from the X coordinate of the closest side of the display area by more than the predetermined distance, the total distance between the touch location and the display area necessarily exceeds the predetermined distance. Therefore, when it is determined at step 224 that the distance between the touch location and the display area of the control key being processed exceeds the predetermined distance in the X direction, the software routine recognizes that the touch location does not fall within the expanded touch zone of the control key being processed and proceeds to step 226. At step 226, the software routine selects the next active control key for processing and then returns to step 214.

When it is determined at step 224 that the distance between the touch location and the display area of the control key being processed does not exceed the predetermined distance in the X direction, the software routine proceeds to step 228. At step 228, a determination is made as to whether the distance between the touch location and the display area of the control key being processed exceeds the predetermined distance in the Y direction. When it is determined at step 228 that the distance exceeds the predetermined distance in the Y direction, the software routine recognizes that the touch location does not fall within the expanded touch zone of the control key being processed and proceeds to step 226 which selects the next active control key for processing and then returns to step 214.

When it is determined at step 228 that the distance between the touch location and the display area of the control key being processed does not exceed the predetermined distance in the Y direction, the software routine proceeds to step 230 wherein the distance between the touch location and the closest pixel of the display area of the control key being processed is calculated utilizing the Pythagorean theorem. As established by the Pythagorean theorem, the distance between the touch location and the closest pixel of the control key display area is equal to the square root of the sum of the square of the difference in X coordinates and the square of the difference in Y coordinates.

After the distance between the touch location and the display area of the control key being processed is calculated at step 230, the software routine proceeds to step 232 (FIG. 8) wherein a determination is made as to whether this distance exceeds the predetermined distance r.

Although the distance between the Touch location and the display area can be calculated using the Pythagorean theorem as described above, in an alternate embodiment of the software routine, the actual distance between the touch location and the display area is not calculated at step 230. Rather, in the alternate embodiment, only the square of the distance is calculated at step 230, thereby eliminating the need to perform a square root operation. In this embodiment, the square of the distance calculated at step 230 is compared, at step 232, with the square of the predetermined distance r. In this manner, the alternate embodiment also determines, at step 232, whether the distance between the touch location and the display area exceeds the predetermined distance r.

Figure 7:
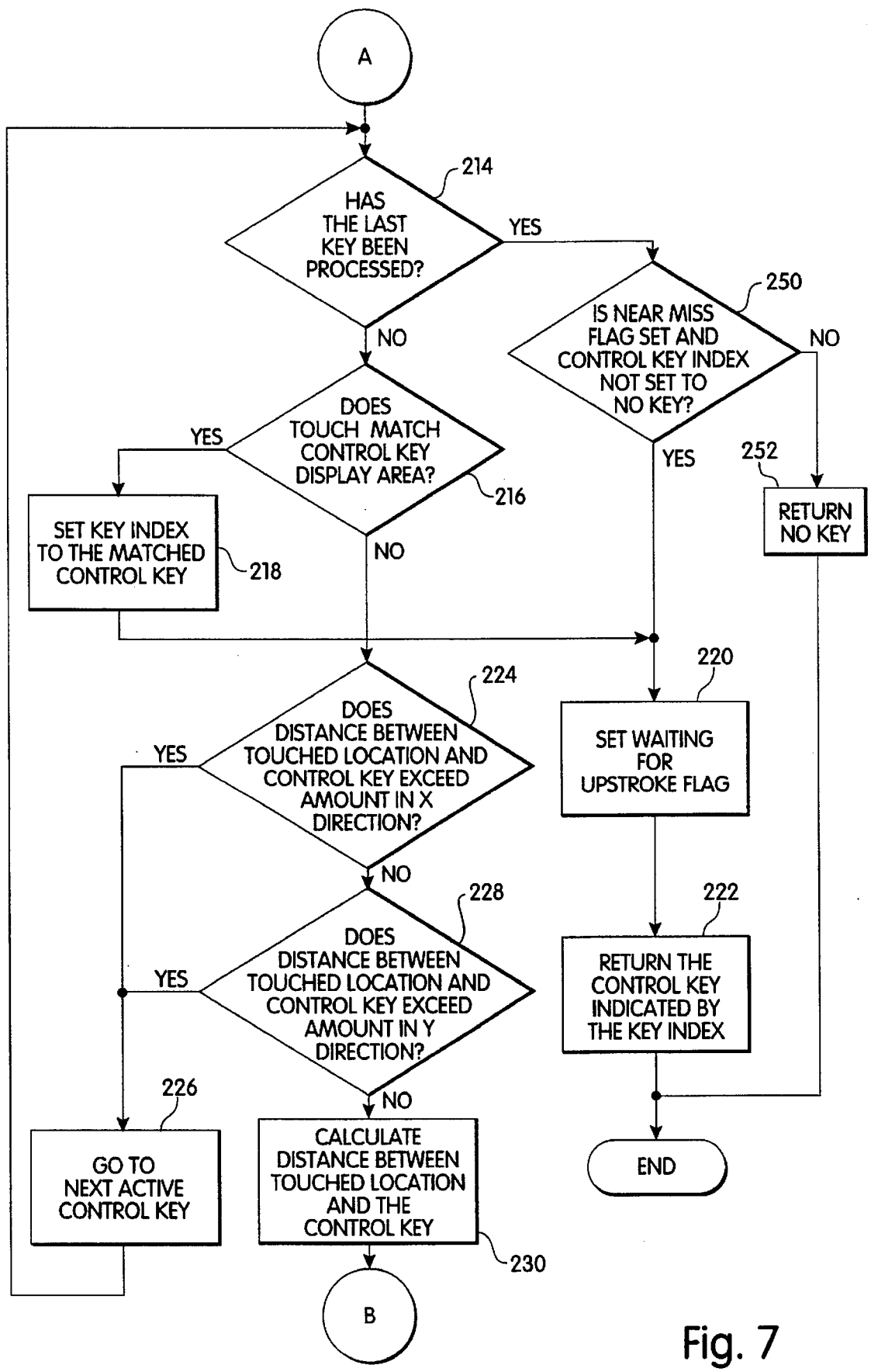

When it is determined at step 232 that the distance between the touch location and the display area of the control key being processed exceeds the predetermined distance r, the software routine recognizes that the touch location does not fall within the expanded Touch zone of the control key being processed. As a result, the routine proceeds to step 234 which selects the next active control key for processing and then returns to step 214 (FIG. 7).

As can be seen from the foregoing, when it is determined at either of steps 224, 228 or 232 that the distance between the touch location and the display area of the control key being processed exceeds the predetermined distance r, the software routine proceeds, through either of steps 226 or 234, to select the next active control key for processing and then returns to seep 214 wherein a determination is made as to whether the last active control key has been processed. As a result, when a control key having a display area that is further away from the touch location than the predetermined distance r is processed, the software routine recognizes that the touch location does not fall within the expanded touch zone of the control key and therefore proceeds to process the next active control key. In this manner, the software routine successively processes the active control keys until either: (1) it is determined at step 232 that the distance between the touch location and the display area of the control key being processed does not exceed the predetermined distance r; or (2) it is determined at step 214 that the last active control key has been processed.

When it is determined at step 232 that the distance between the touch location and the display area of the control key being processed does not exceed the predetermined distance, the software routine proceeds to step 236 wherein a determination is made as to whether the near miss flag is set. The near miss flag is set when the distance between the touch location and the display area of at least one previously processed active control key is less than the predetermined distance r. Therefore, the near miss flag indicates that the touch location either falls within the expanded touch zone of one of the active control keys, or falls within a dead zone between two active control keys.

When it is determined at step 236 that the near miss flag is not set, the software routine proceeds to step 238 wherein the following three functions are performed: (1) the near miss flag is set indicating that the distance between the touch location and the display area of the control key being processed is less than the predetermined distance; (2) a near miss distance value is stored indicating the distance, calculated at step 230, between the touch location and the display area of the control key being processed; and (3) the key index is set equal to the control key currently being processed. The three pieces of information updated at step 238 indicate that the distance between the touch location and the display area of the control key currently being processed is less than the predetermined distance, and that the control key being processed is closer than any previously processed active control key. As a result, the control key currently being processed is established as a near miss control key. After the three functions are performed at step 238, the software routine proceeds to step 234 which selects the next active control key for processing and returns to step 214 (FIG. 7).

When it is determined at step 236 that the near miss flag is set, the software routine proceeds to step 240 wherein a determination is made as to whether the distance between the touch location and the display area of the control key currently being processed is less than the near miss distance minus the predetermined dead zone size. The software routine advances to step 240 only when the touch location is less than the predetermined distance r from the display areas of at least the following two active control keys: (1) the control key currently being processed and (2) a near miss control key that is stored as the key index and has its distance from the touch location stored as the near miss distance. The touch location may fall within the expanded touch zone of either of these control keys, or it may fall within a dead zone defined between the two as will be shown by making reference to FIG. 3(b).

FIG. 3(b) illustrates two adjacent control keys 17 and 19. Expanded touch zones 20 and 22 are respectively defined for the active control keys 17 and 19 and are shown as dotted lines. A dead zone 24 having a size d is defined between the expanded touch zones 20 and 22. Three touch locations 510, 511 and 512 are shown, each located at a distance from the display areas of both control keys 17 and 19 that is less than the predetermined distance r. However, as can be seen from FIG. 3(b), the adaptive touch recognition system of the present invention recognizes each of these touches in a significantly different manner. A touch at location 510 falls within the expanded touch zone 22 and therefore indicates that control key 19 has been selected. A touch at location 512 falls within the expanded touch zone 20 and therefore indicates that control key 17 has been selected. Finally, a touch at location 511 falls within the dead zone 24 between the expanded touch zones 20 and 22 and therefore indicates that no active control key has been selected.

As stated above, the software routine proceeds to step 240 only when the distances between the touch location and the display areas of two active control keys are each less than the predetermined distance r. Therefore, the software routine must determine whether the touch location falls within the dead zone between the control keys and if it does not, which of the control key's expanded touch zones it falls within. In step 240, a determination is made as to whether the distance between the touch location and the display area of the control key currently being processed is less than the near miss distance minus the dead zone size. When it is determined that the distance is less than the near miss distance minus the dead zone size, the touch location does not fall within the dead zone between the near miss key and the control key currently being processed, and may fall within the expanded touch zone of the control key currently being processed. Therefore, when this determination is made, the software routine proceeds to step 238 wherein the following three functions are performed: (1) the near miss flag is set; (2) the near miss distance is updated to indicate the distance between the touch location and the display area of the control key currently being processed; and (3) the key index is updated to indicate the control key currently being processed. The key index and near miss distance value are updated at step 238 to indicate the fact that the touch location is closer to the control key currently being processed than it is to the prior near miss key. Therefore, the control key currently being processed is closer to the touch location than any previously processed control key. The key index and the near miss distance are updated at step 238 to establish the control key currently being processed as the near miss control key.

When it is determined at step 240 that the distance between the touch location and the display area of the control key currently being processed is greater than the near miss distance minus the dead zone size, the software routine proceeds to step 242 wherein a determination is made as to whether the near miss distance is less than the distance between the touch location and the display area of the control key currently being processed minus the dead zone size. The determination made at step 242 is very similar to the determination made at step 240. The purpose of the determination made at step 242 is to determine whether the touch location may fall within the expanded touch zone of the near miss control key that is stored in the control key index and has its distance stored as the near miss distance value. When it is determined at step 242 that the near miss distance is less than the distance between the touch location and the display area of the control key currently being processed minus the dead zone size, the touch location does not fall within the dead zone defined between the near miss control key and the control key currently being processed, and the touch location may fall within the expanded touch zone of the near miss control key. When this determination is made, the near miss control key is the closer to the touch location than any of the control keys that have been processed. Therefore, the control key index and the near miss distance value already indicate the control key that is closest to the touch location and need not be updated. Consequently, the software routine proceeds to step 234 which selects the next active control key for processing and then returns to step 214 (FIG. 7).

When it is determined at step 242 that the near miss distance is not less than the distance between the touch location and the display area of the control key currently being processed minus the dead zone size, the touch location may fall within a dead zone defined between the near miss control key and the control key currently being processed. Therefore, the software routine proceeds to step 244 wherein the key index is updated to indicate that no key has been selected. As previously stated, in one embodiment of the adaptive touch recognition process of the present invention, dead zones are defined between the expanded touch zones of adjacent active control keys. When the user touches a location that falls within a dead zone between two adjacent active control keys, the adaptive touch recognition process does not recognize the touch as selecting any active control key. Therefore, when the software routine proceeds to step 244, the routine recognizes that the touch location may fall within a dead zone between the control key currently being processed and the near miss control key and sets the key index to no key in step 244 to indicate that no active control key has been selected.

As stated above, when the software routine proceeds to step 244, the touch location may fall within a dead zone between the control key currently being processed and the near miss control key. However, the software routine does not make a final determination as to whether the touch location falls within a dead zone until it has completed processing all the active control keys for reasons that are explained by making reference to FIG. 3(c). FIG. 3(c) illustrates three control keys 27, 29 and 31 respectively having expanded touched zones 32, 34 and 36. Each of the control keys is positioned adjacent to the other two. Dead zones 38, 42 and 40 are respectively formed between the control key pairs (27, 29), (29, 31) and (27, 31). A touch location 538 is shown in FIG. 3(c) that is within the predetermined distance r of the display areas of each of the control keys 27, 29 and 31. In response to a touch of the display panel occurring at touch location 538, the software routine of FIGS. 6–8 would be called to determine which, if any, of control keys 27, 29 or 31 had been selected by the touch. As stated above, the order in which the control keys are processed is essentially arbitrary. Therefore, control key 27 may be the first control key processed. If control key 27 were the first of the three control keys to be processed, control key 27 would be established as the near miss control key at step 238 because the touch location 538 is within the predetermined distance r from the display area of control key 27. Thereafter, if control key 29 were the next control key processed, the software routine would proceed to step 244 and would set the key index to indicate that no key had been selected. The reason that the software routine would proceed in this manner is that when control keys 27 and 29 are the only two control keys that have been processed, the touch location 538 appears to fall within a dead zone established between the expanded touch zones of these control keys. However, when control key 31 was processed, the software routine would determine at step 240 that the distance between the touch location 538 and the display area for control key 31 is less than the near miss distance (indicating the distance between touch location 538 and the display area of the closer of control keys 27 or 29) minus the dead zone size. Therefore, the software routine would proceed to step 238 which would set the key index to indicate that control key 31 had been selected.

Figure 8:
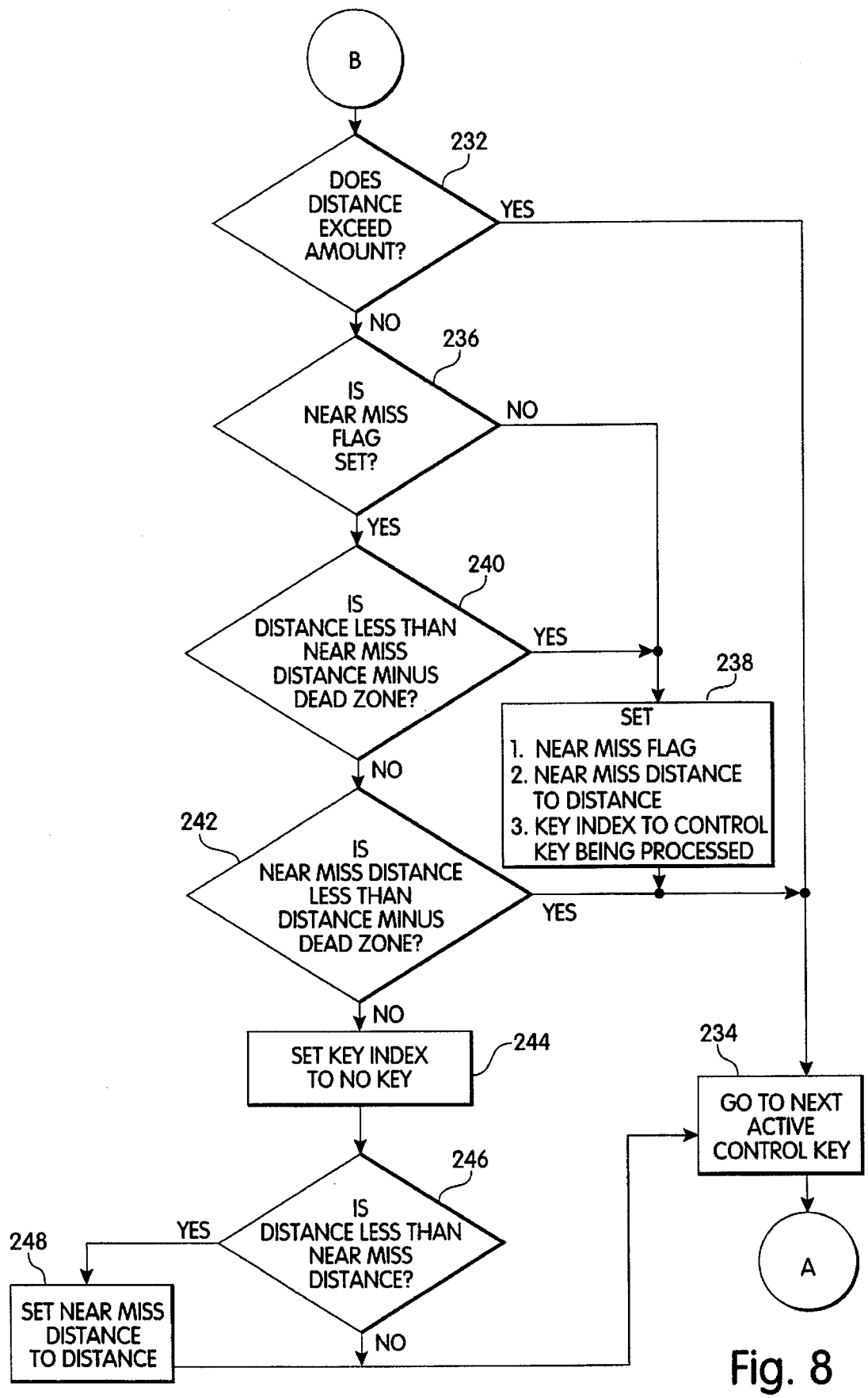

As can be seen from the foregoing, the software routine illustrated in FIGS. 6–8 does not make a final determination as to whether the touch location falls within a dead zone between two active control keys until it has processed every active control key because, as shown in FIG. 3(c), a touch location that might originally appear to fall within the dead zone between two active control keys may actually fall within the expanded touch zone of a third and closer control key.

Returning to the description of the software routine shown in FIGS. 6–8, after the key index is set at step 244 to indicate that no active control key has been selected, the routine proceeds to step 246 wherein a determination is made as to whether the distance between the touch location and the display area of the control key currently being processed is less than the near miss distance and if it is not, the routine proceeds to step 234 which selects the next active control key for processing and returns to step 214 (FIG. 7).

When it is determined at step 246 that the distance between the touch location and the display area of the control key currently being processed is less than the near miss distance, the software routine proceeds to step 248 wherein the near miss distance value is updated to correspond to the distance between the touch location and the display area of the control key currently being processed. The reason for updating the near miss distance at step 248 is best described by making reference to FIGS. 9(a)–9(e).

Figure 9A:
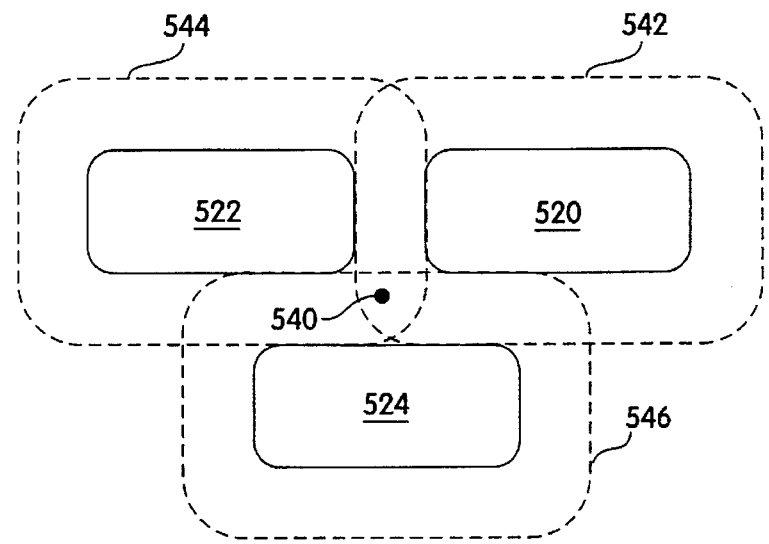
FIGS. 9(a)–9(e) illustrate three adjacent active control keys and the manner in which dead zones are defined between each pair of the three active control keys.

FIGS. 9(a)–(e) show three adjacent control keys 520, 522 and 524. FIG. 9(a) also illustrates, in dotted lines, areas 542, 544 and 546 that are respectively spaced from the display areas of control keys 520, 522 and 524 by the predetermined distance r in every direction. FIG. 9(a) further indicates a touch location 540 that is located within each of the areas 542, 544 and 546.

Figure 9B:
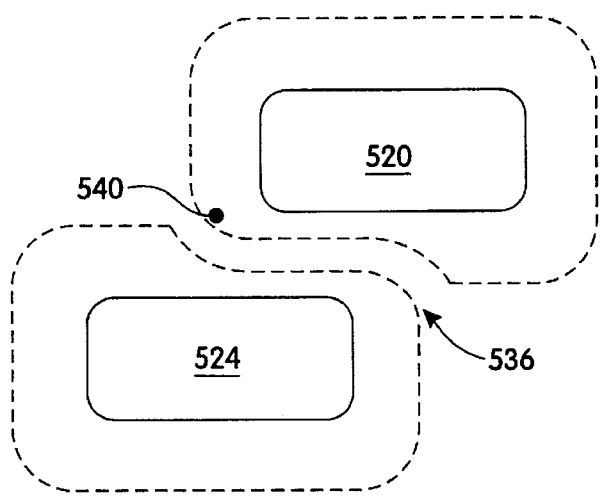
Figure 9C:
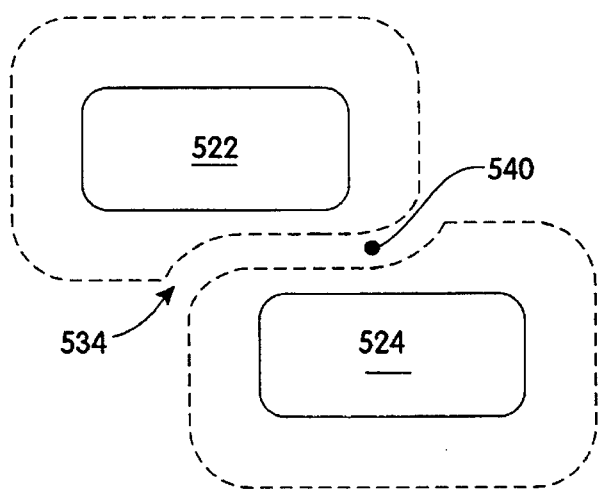
Figure 9D:
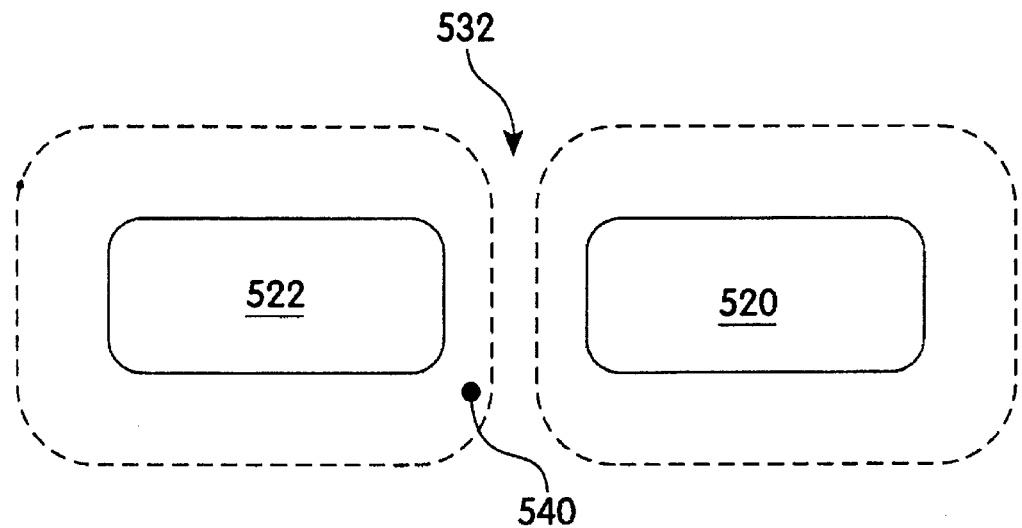

FIG. 9(b) illustrates a dead zone 536 that is formed between control keys 520 and 524; FIG. 9(c) illustrates a dead zone 534 that is formed between control keys 522 and 524; and FIG. 9(d) illustrates a dead zone 532 formed between the control keys 520 and 522. As stated above, the order in which the active control keys are processed by the software routine shown in FIGS. 6–8 is essentially arbitrary. Therefore, if the software routine were called in response to the display panel being touched at touch location 540, the control keys 520, 522 and 524 could be processed in any order. If control key 524 were selected as the first control key to be processed, the software routine would, at step 232, determine that the distance between touch location 540 and the display area of control key 524 does not exceed the predetermined distance r and the routine would proceed to step 236. At step 236, it would be determined that the near miss flag was not set since control key 524 would be the first key processed and therefore, the routine would proceed to step 238 wherein control key 524 would be established as the near miss control key.

After control key 524 was processed, the software routine would proceed to step 234 wherein the next control key would be selected for processing. For the purpose of illustration, it is assumed that control key 522 is selected as the next control key to be processed. As can be seen from FIG. 9(c), the touch location 540 is in the dead zone 534 between control keys 522 and 524. Therefore, in the manner described above, the software routine would proceed to step 244 wherein it would set the key index to indicate that no active control key had been selected. Thereafter, the software routine would proceed to step 246 wherein a determination would be made as to whether the distance between the touch location 540 and the display area of control key 522 is less than the near miss distance (indicating the distance between touch location 540 and the display area of control key 524). At step 246, it would be determined that the touch location is closer to the display area of control key 522 and therefore, the software routine would proceed to step 248 wherein the near miss distance would be updated to indicate the distance between touch location 540 and the display area of control key 522. The updating of the near miss distance in this manner is significant because of the way it effects the subsequent processing of control key 520.

Figure 9E:
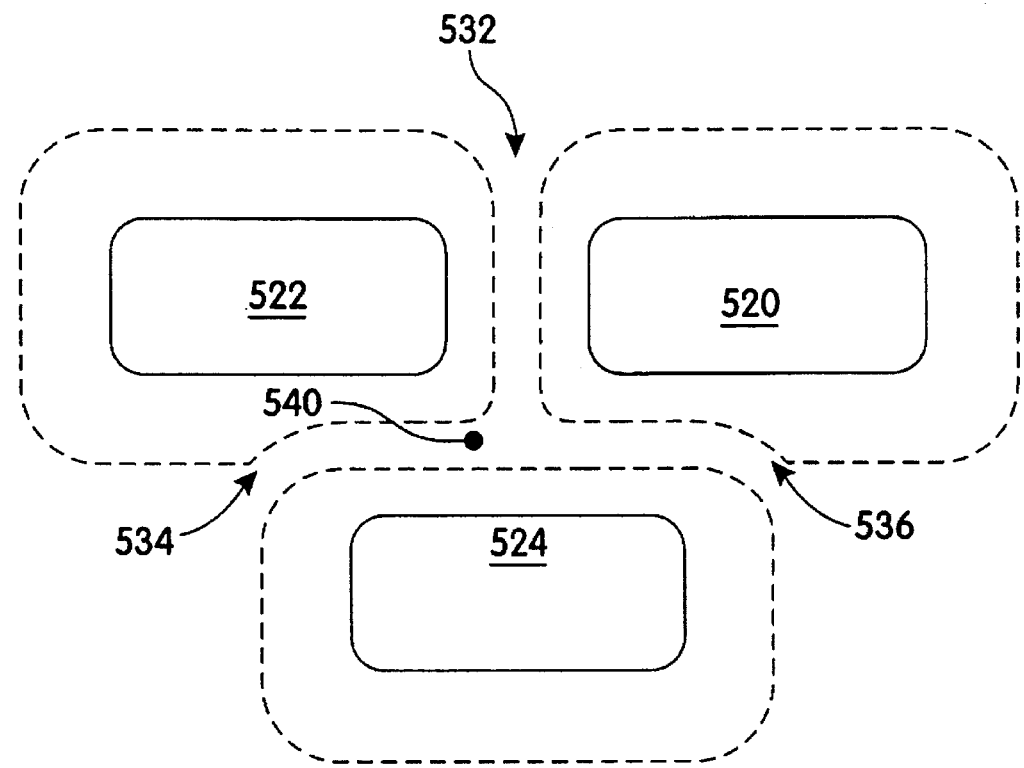

As can be seen from FIG. 9(b), if control keys 520 and 524 are the only two considered, touch location 540 appears to fall within the expanded touch zone of control key 520 because it is closer to control key 520 by more than the dead zone size. However, as shown in FIG. 9(e), when each of the three control keys are considered, touch location 540 falls within a dead zone between control keys 522 and 524 and therefore, does not select any active control key.

When control key 520 is processed by the software routine of FIGS. 6–8, the software routine determines, at step 240, whether the distance between the touch location 540 and the display area of control key 520 is less than the near miss distance minus the dead zone size. Therefore, if the near miss distance is not updated at step 248 to indicate the distance from control key 522, the software routine would determine, at step 240, that the distance between touch location 540 and control key 520 is less than the near miss distance minus the dead zone size because as shown in FIG. 9(b), touch location 540 is closer to control key 520 than it is to control key 524 by more than the dead zone size. As a result, the software routine would proceed to step 238 which would set the key index to control key 520, thereby indicating that control key 520 had been selected by the user. This result would be incorrect because, as shown in FIG. 9(e), the touch location 540 falls within the dead zone 534 between control keys 522 and 524 and therefore, does not select any active control key.

The reason that the software routine of FIGS. 6–8 updates the near miss distance at step 248 is to prevent the above-described error from occurring. If the software routine were to process the control keys in the order described above, the software routine would, when processing control key 522, update the near miss distance at step 248 to indicate the distance between touch location 540 and the display area for control key 522 because, as shown in FIG. 9(d), the distance between the touch location 540 and the display area of control key 522 is less than the distance to the display area of control key 524. After the near miss distance was updated at step 248, the software routine would proceed, at step 234, to select control key 520 for processing. While processing control key 520, the software routine would proceed to step 240 wherein a determination would be made as to whether the distance between the touch location 540 and the display area of control key 520 was less than the near miss distance (indicating the distance between touch location 540 and the display area of control key 522) minus the dead zone size. As shown in FIG. 9(d), the distance between the touch location 540 and the display area of control key 522 is less than the distance between the touch location and the display area of control key 520. Therefore, the software routine would proceed to step 242 which would determine that the near miss distance was less than the distance between touch location 540 and control key 520 minus the dead zone size. Therefore, the software routine would proceed to process the next active control key without updating the key index. As a result, the key index would continue to reflect the fact that no active control key had been selected which is the correct indication since the touch location is within a dead zone between two active control keys.

Reference is again made to the software routine illustrated in FIGS. 6–8. As described above, when it is determined at step 202 (FIG. 6) that a downstroke has occurred, the software routine begins processing the active control keys and terminates in one of two ways. The first way in which the software routine terminates results from a determination at step 216 (FIG. 7) that the touch location matches the control key display area for an active control key. When this determination is made, the software routine sets the key index to the matched control key at step 218, sets the waiting for upstroke flag at step 220, returns the control key indicated by the key index at step 222 and then terminates.

When the touch location does not match the display area for any active control key, the software routine terminates only after each of the active control keys has been processed. Each active control key must be processed because, as described above, even when it is determined that the touch location falls within the predetermined distance r from the display area of an active control key, the software routine cannot be certain that the touch location falls within the expanded touch zone for that control key. When it is determined that the touch location does not match the display area for the active control key being processed, the software routine completes the processing of the control key at any one of various steps and then, at either step 226 (FIG. 7) or step 234 (FIG. 8), selects the next active control key for processing and returns to step 214 (FIG. 7) wherein a determination is made as to whether the last active control key has been processed.

When it is determined at step 214 that the last active control key has been processed, the software routine proceeds to step 250 (FIG. 7) wherein a determination is made as to whether the following two conditions are true: (1) the near miss flag is set and (2) the control key index does not indicate that no active control key has been selected. When it is determined at step 250 that each of these conditions is satisfied, the software routine recognizes that the touch location falls within the expanded touch zone for the control key indicated by the control key index. Therefore, when the two conditions are satisfied, the software routine proceeds to step 220 wherein the waiting for upstroke flag is set in the manner described above. Thereafter, the software routine returns the control key indicated by the key index in step 222 and then terminates.

When it is determined at step 250 that either of the two above-described conditions is not satisfied, the software routine recognizes that no active control key has been selected. When the near miss flag is not set, the touch location does not fall within the predetermined distance r from the display area of any active control key and therefore, does not select any active control key. However, the near miss flag is not the only condition utilized to determine whether an active control key has been selected because when a touch location falls within the dead zone between two active control keys, the near miss flag is set even though no active control key has been selected. A touch location that falls within the dead zone between two active control keys is indicated by the near miss flag being set, and the control key index indicating that no active control key has been selected. Therefore, when it is determined at step 250 that the near miss flag is set and the control key index indicates that no active control key has been selected, it indicates that the touch location falls within a dead zone and that no active control key has been selected.

When it is determined at step 250 that either of the two above-described requirements has not been met, the software routine proceeds to step 252 which returns an indication that no active control key has been selected and then terminates. It should be noted that when no active control key has been selected, the waiting for upstroke flag is not set. As a result, when the user touches the probe to a location on the display panel that does not fall within the expanded touch zone for any active control key, the user may move the probe along the display panel until it falls within the expanded touch zone of an active control key and the movement into an expanded touch zone will be recognized as selecting the corresponding active control key. Therefore, the user can touch the probe to the display panel and then move it into proper location for selecting a desired active control key without having to first remove the probe from the display panel because the waiting for upstroke flag, which inhibits the recognition of all downstrokes, is not set until an active control key has been selected.

It should be understood that various changes and modifications of the embodiments shown in the drawings may be made within the scope of this invention. Thus, it is intended that all matter contained in the above description and shown in the accompanying drawings shall be interpreted in an illustrative and not limiting sense.

What I claim is:

1. A method for operating a touch sensitive user interface panel, the user interface panel having one or more active control keys, each of which indicates an active control function within a display area and which causes selection of the active control function when a user touches the panel within the display area, the method comprising the steps of:

defining expanded touch zones for each active control key, the expanded touch zone for each active control key having an area that is larger than the corresponding display area for the control key, including the step of displaying at least one additional control key based upon selection of one control key, and adaptively redefining the dimensions and shape of the expanded touch zone for each active control key based upon the selection of said one control key and the location of said additional control key; and when the user touches the interface panel within an expanded touch zone for an active control key, selecting the active control function indicated by the active control key corresponding to the expanded touch zone that was touched.

2. A method for operating a touch sensitive user interface panel as recited in claim 1 wherein the step of defining expanded touch zones includes the step of defining a boundary for each expanded touch zone that is spaced from its corresponding control key display area by a predetermined distance in at least one direction.

3. A method for operating a touch sensitive user interface panel as recited in claim 1 wherein the interface panel includes a plurality of active control keys and wherein the step of defining expanded touch zones includes the step of defining nonoverlapping expanded touch zones.

4. A method for operating a touch sensitive user interface panel as recited in claim 3 wherein the step of defining expanded touch zones includes the step of defining an expanded touch zone, for each active control key, that has a boundary that is spaced from its corresponding control key display area by a predetermined distance in every direction except for directions facing adjacent active control keys; and wherein the step of defining nonoverlapping expanded touch zones includes the step of defining an expanded touch zone, for each active control key, that has a boundary that is spaced from its corresponding control key display area by less than the predetermined distance in directions facing adjacent active control keys to ensure that expanded touch zones of adjacent active control keys do not overlap.

5. A method for operating a touch sensitive user interface panel as recited in claim 1 wherein the interface panel includes a plurality of active control keys and wherein the step of defining expanded touch zones includes the step of defining the expanded touch zones such that the boundary of each expanded touch zone is spaced by a dead zone distance from the boundary of every other expanded touch zone so that dead zones are defined between expanded touch zones of adjacent active control keys.

6. A method for operating a touch sensitive user interface panel as recited in claim 5 wherein the step of defining expanded touch zones includes the step of defining an expanded touch zone, for each active control key, that has a boundary that is spaced from its corresponding control key display area by a predetermined distance in every direction except for directions facing adjacent active control keys; and wherein the step of defining the expanded touch zones such that the boundary of each expanded touch zone is spaced by a dead zone distance from the boundary of every other expanded touch zone includes the step of defining an expanded touch zone, for each active control key, that has a boundary that is spaced from its corresponding control key display area by less than the predetermined distance in directions facing adjacent active control keys to ensure that the expanded touch zones for adjacent active control keys are spaced by the dead zone distance.

7. A method for operating a touch sensitive user interface panel as recited in claim 1 including the additional steps of:

when it is determined that the user has touched a probe to an expanded touch zone for any active control key, inhibiting the processing of further touches of the interface panel that occur prior to the probe being removed from contact with the interface panel.

8. A user interface subsystem for user control of an electronic system, comprising:

a touch sensitive user interface panel having one or more active control keys, each of which indicates an active control function within a display area and which causes selection of the active control function when a user touches the panel within the display area; and control means, responsive the user touching the interface panel within an expanded touch zone of an active control key, for selecting the active control function of the active control key, the expanded touch zone for each active control key having an area that is larger than the corresponding display area for the active control key, said control means including means for displaying at least one additional control key based upon selection of one control key, and adaptively redefining the dimensions and shape of the expanded touch zone for each active control key based upon the selection of said one control key and the location of said additional control key.

9. A user interface subsystem as recited in claim 8 wherein the interface panel includes a plurality of active control keys and wherein the expanded touch zones for the plurality of active control keys are nonoverlapping.

10. A user interface subsystem as recited in claim 9 wherein the expanded touch zone for each active control key has a boundary that is spaced from its corresponding control key display area by a predetermined distance in every direction except for directions facing adjacent active control keys, and is spaced from its corresponding control key display area by less than the predetermined distance in directions facing adjacent active control keys so that expanded touch zones for adjacent active control keys do not overlap.

11. A user interface subsystem as recited in claim 8 wherein the interface panel includes a plurality of active control keys and wherein the expanded touch zone for each active control key has a boundary that is spaced by at least a dead zone distance from the boundary of every other expanded touch zone so that dead zones are defined between adjacent active control keys.

12. A user interface subsystem as recited in claim 11 wherein the expanded touch zone for each active control key has a boundary that is spaced from its corresponding control key display area by a predetermined distance in every direction except for directions facing adjacent active control keys, and is spaced from its corresponding control key display area by less than the predetermined distance in directions facing adjacent active control keys so that expanded touch zones for adjacent active control keys are spaced by the dead zone distance.

* * * * *